Nov. 27, 1962 J. F. HECHTMAN ET AL 3,066,043
CELLULOSIC PRODUCT COMPRISING SATURATED FIBROUS WEB
HAVING A COATING COMPRISING VINYL RESIN AND ALKYL
ACRYLATE-CARBOXYLIC ACID PLASTICIZER
Filed April 10, 1958

Fig-1

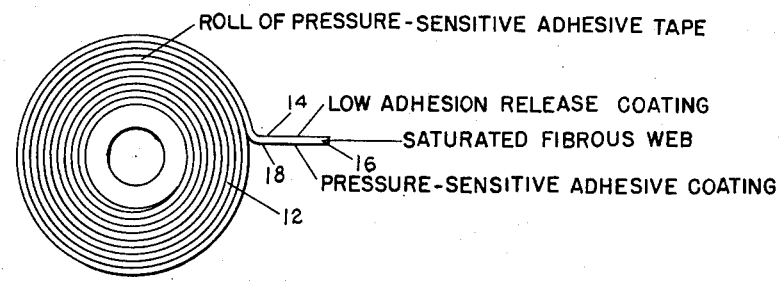

ROLL OF PRESSURE-SENSITIVE ADHESIVE TAPE
14 LOW ADHESION RELEASE COATING
SATURATED FIBROUS WEB
16
18 PRESSURE-SENSITIVE ADHESIVE COATING
12

Fig-2

14 — LOW ADHESION RELEASE COATING
16 — SATURATED FIBROUS WEB

Fig-3

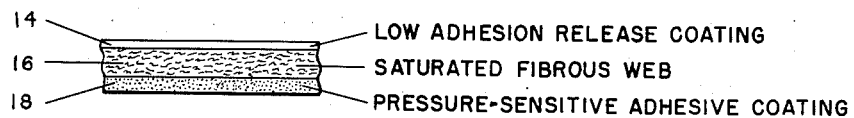

14 — LOW ADHESION RELEASE COATING
16 — SATURATED FIBROUS WEB
18 — PRESSURE-SENSITIVE ADHESIVE COATING

United States Patent Office 3,066,043
Patented Nov. 27, 1962

3,066,043
CELLULOSIC PRODUCT COMPRISING SATURATED FIBROUS WEB HAVING A COATING COMPRISING VINYL RESIN AND ALKYL ACRYLATE-CARBOXYLIC ACID PLASTICIZER
John F. Hechtman and Edwin G. Greenman, Munising, Mich., assignors to Kimberly-Clark Corporation, Neenah, Wis., a corporation of Delaware
Filed Apr. 10, 1958, Ser. No. 727,671
7 Claims. (Cl. 117—68.5)

This invention relates generally to improved web or sheet products and has particular relation to fibrous webs or sheet products which are coated with a functional polymeric resin coating. Such webs are used commercially in the manufacture of various products including pressure sensitive adhesive tapes, motion picture projection screens, artificial leather, window shades, wall coverings, shelf liners, book covers, and the like.

One of the properties of functional coatings to which the present invention relates, is a low adhesion for normally tacky, pressure sensitive adhesives. Fibrous webs having such a coating are especially suitable as a base sheet or backing material for pressure sensitive tapes.

Pressure sensitive tape, as now known in the art, generally comprise a flexible base web or backing material, a normally tacky, pressure sensitive adhesive on one side thereof, and a low adhesion or release coating on the opposite side.

The tape as ultimately furnished to the end user is usually in roll form. Ideally these rolls are wound tightly so that they do not slip or telescope during shipment and handling. Yet, when ready for use, they must unwind readily and without damage to the flexible backing or to the adhesive coating. It is essential to this requirement that the backing material be sufficiently strong so that it does not tear or delaminate when subjected to the stresses of unwinding. It is equally important that when the tape is in roll form the adherence of the pressure sensitive adhesive coating to the back surface of the tape be firm, but not so firm as to pull the adhesive coating from its attachment to the front surface of the backing material during use. The pressure sensitive adhesive coating is usually tackified natural rubber. Flexible backing materials currently utilized include non-fibrous unsupported films and fibrous webs. Examples of non-fibrous film backing materials are regenerated cellulose, plasticized cellulose acetate, and various vinyl polymers and copolymers. Useful fibrous web backing material include fabrics and non-woven materials such as paper, carded and felted webs, etc. The fibrous webs may be unified and strengthened by suitable saturation with organic bonding agents or by other internal strengthening procedures including sizing, the use of activated thermoplastic fibers as a component of the web, powdered resins, and the like. Embodiments of our invention for use in pressure sensitive tapes will usually include a flexible backing material of the fibrous web type, and in most instances this material will constitute cellulosic fiber saturated with an elastomeric binder.

Low adhesion release coatings which have been developed heretofore to control adhesion of pressure sensitive adhesives to the backing materials and to prevent the above mentioned delamination have not been wholly satisfactory in use. One difficulty that has been observed is a tendency of certain release coating ingredients to migrate from the back side of the tape to the adjacent pressure sensitive adhesive in the roll. This migration tendency is undesirable since it destroys or weakens useful properties of the pressure sensitive adhesive and shortens the shelf life of the tape product. Another problem is the lack of suitable release coatings which have light initial color and the ability to retain this desirable color during processing and normal usage.

In addition to the other requirements noted above, a satisfactory release coating should have a surface conducive to good printing, including adequate ink adhesion properties. The latter is especially true when the tape is utilized as a marking tape in which a legend or identification mark is printed or written on the surface. At the same time the surface should be essentially unaffected by the solvents used in the printing inks.

The present invention overcomes the disadvantages of the presently known backing materials for pressure sensitive adhesive tapes and at the same time it provides all of the necessary desirable characteristics for this product. The properties of light initial color, improved heat and light aging, good printability, and solvent resistance made possible by the invention are also advantageous in other end uses for coated webs and sheet products, as previously noted.

The general object of the present invention is to provide improved coatings for fibrous webs.

A more specific object of the invention is to provide improved release coatings for saturated fibrous webs suitable for use as the base sheet for pressure sensitive adhesive tapes.

Still another object of the invention is the provision of a fibrous web coated with an initially light colored polyvinyl resin coating having improved heat and color aging characteristics, solvent resistance and improved printability.

Additional objects will be apparent from the following description of certain preferred embodiments of the invention. The accompanying drawing illustrates several embodiments of the invention.

In the drawing:

FIGURE 1 is a diagrammatic side view of a roll of adhesive tape 12 consisting of a saturated fibrous web 16 coated on one side with a low adhesion release coating 14 and on the other side with a pressure sensitive adhesive 18. The tape is wound with the pressure sensitive adhesive on the inside.

FIGURE 2 is an enlarged cross section of a portion of a saturated fibrous web 16 coated on one side with a low adhesion release coating 14.

FIGURE 3 is an enlarged cross section of a portion of the pressure sensitive adhesive tape of FIGURE 1 comprising a saturated fibrous web 16 coated on one side with a low adhesion release coating 14 and on the other side with a pressure sensitive adhesive 18.

Prior to our invention the coating which came closest to meeting the requirements outlined above was a vinyl resin-nitrile rubber blend. Such a material is described in United States Patent 2,330,353 dated September 28, 1943. That patent also describes the use of a polymeric butadiene-acrylonitrile as a plasticizer for the vinyl resin. However, since the butadiene-acrylonitrile is an unsaturated polymer, its presence lowers the resistance of the composition to oxidation, and makes it vulnerable to degradation and discoloration upon extended exposure to air.

The present invention is based on our discovery that a polymeric vinyl resin can be externally plasticized by physically blending with it a copolymer comprising an initially unsaturated carboxylic acid and an alkyl acrylate, thereby producing a novel functional coating. The product according to the invention is useful as a light colored coating for flexible fibrous webs and is especially useful as a release coating for pressure sensitive tapes. The peculiar combination of the repellent or low adhesive property of the coating toward pressure sensitive adhesives and a strong adherent attraction of the coating to the cellulosic fibers of both saturated and unsaturated fibrous webs is important to the success of one form of the invention. When combined further with the properties of improved printability, resistance to ink solvents, and excellent initial color plus resistance to degradation from heat and light aging and oxidation, which are all present in compositions in accordance with the invention, a product of unusual merit is obtained.

Polyvinyl resins which may be used in the coating composition include polyvinyl chloride, polyvinyl acetate, copolymers of vinyl chloride and vinyl acetate, copolymers of vinyl chloride and vinylidene chloride and modified vinyl chloride copolymers in which the vinyl chloride predominates and has been copolymerized with lesser, but modifying, ratios of compatible monomers. Preferred resins include polyvinyl chloride, and a copolymer comprising a major portion of the vinyl chloride and a minor portion of an alkyl acrylate.

The external plasticizing material which is physically blended with the polyvinyl resin to provide a homogeneous mixture for use in the coating composition of our invention is a material containing a copolymer formed of at least one polymerizable $\alpha$-$\beta$ unsaturated carboxylic acid in which the unsaturation is a double bond or ethylenic linkage, and at least one alkyl acrylate in which the alkyl group has from one to four carbon atoms. Examples of polymerizable mono-unsaturated $\alpha$-$\beta$ ethylenic carboxylic acids include: acrylic acid, methacrylic acid, itaconic acid, aconitic acid, maleic acid, fumaric acid, and the like. Examples of alkyl acrylates include the esters of primary alkanols, such as methyl acrylate, ethyl acrylate, propyl acrylate, and butyl acrylate; and esters of secondary alkanols, such as iso-propyl acrylate and iso-butyl acrylate. Hardening comonomers may be introduced in cases where these copolymers are too soft. Examples of such hardening comonomers include the alkyl methacrylates in which the alkyl group may have from one to four carbon atoms, for example; the methyl, ethyl, propyl, iso-propyl, butyl, and iso-butyl methacrylates.

Satisfactory copolymer plasticizers in accordance with the invention can be produced by use of the above named monomers in amounts from about 0.5 to about 7 percent by weight of a carboxylic acid, at least 80 percent by weight of an alkyl acrylate, and from 0 percent to 19.5 percent of an alkyl methacrylate.

The following are typical copolymer compositions which may be used as the external plasticizer in the coating mixture. Percentages given are by weight:

|  | Percent |
|---|---|
| Ethyl acrylate | 84.5 |
| Methyl methacrylate | 10.5 |
| Itaconic acid | 5.0 |
| Ethyl acrylate | 85.0 |
| Methyl methacrylate | 10.0 |
| Acrylic acid | 5.0 |
| Ethyl acrylate | 95.0 |
| Acrylic acid | 5.0 |
| Ethyl acrylate | 95.0 |
| Methacrylic acid | 5.0 |

Techniques for polymerizing the foregoing monomers into the copolymers are illustrated in United States Patents 2,760,886 dated August 28, 1956; 2,790,735 dated April 30, 1957; 2,790,736 dated April 30, 1957; and 2,795,564 dated June 11, 1957.

The copolymer dispersions may be made by any of the well known emulsion copolymerization procedures, e.g., by mixing the several monomers in the desired proportions into an aqueous solution of an anionic or preferably a non-ionic dispersing or emulsifying agent.

Before being coated with the functional coating, the fibrous base sheet, which usually consists of natural cellulosic fibers such as wood fiber, cotton, hemp or other vegetable fibers, but may include synthetics such as nylon, rayon, Dacron polyester fiber, and the like, may be saturated by any one of the various saturating processes now utilized in the industry. For example, a web of fibrous material may be fed from a supply roll into a saturating section. The saturating section may consist of squeeze rolls so located that the nip has a downward angle into which the paper is fed, forming a trough between the paper and top squeeze roll so that the saturant can be supplied in this trough. Alternatively, the saturating section may be a float tank prior to squeeze rolls in which the paper is floated on the surface of the saturant and becomes impregnated by capillary forces carrying the saturant into the sheet. Excess saturant is removed by the squeeze rolls as in the previous operation and the saturant vehicle may be evaporated by passing the sheet over heated rolls, through a hot air tunnel, or through a festoon dryer. Another way of saturating the paper is through the use of a conventional sizing press, or a coating press, on the paper machine itself.

The saturant used may be a natural rubber latex or a synthetic elastomer. The latter includes such materials as butadiene-styrene copolymers, polychloroprene, butadiene-acrylonitrile copolymers, a copolymer of vinyl chloride and vinylidene chloride, polyvinyl chloride, polymerized methyl, ethyl, or butyl acrylate, or methyl, ethyl, or butyl acrylate copolymerized with acrylonitrile or ethyl, methyl, or butyl methacrylate, polystyrene and the like.

Impregnating is usually done from an aqueous dispersion although solutions in suitable solvents may also be used. The amount of solids in the saturant and the amount retained in the saturated fibrous web may be controlled by various methods known in the art and is determined by the particular end use for which the finished product is intended.

After saturation the dried web is coated with apparatus commonly used in the industry for this purpose. Such apparatus may include coating applicators such as a single roll coater, a multiple roll coater, an air knife coater, a trailing knife coater, an intaglio coater and the like. The coating is dried by suitable means such as an air tunnel and then is subjected to a temperature sufficiently high to fuse the components into a uniform mass. The coated sheet is then cooled by passing it over chilled rolls before being wound up into rolls for further processing.

A coating method we have found to be particularly suitable is to run the sheet to be coated directly over an applicator roll partially immersed in a pool of coating material. The excess coating is doctored off with a so-called equalizing rod, a wire wound rod of the Mayer rod type. The size of the equalizing rod and its wire winding may be varied to control the weight of the dry coating from about 2 to 12 pounds on a dry solids basis per 17 x 22—500 sheet ream. A relatively coarse wire winding is used for the heavier coatings, while a fine wire winding is used for lighter coatings. Still heavier weights may be applied by multiple coating.

After coating, the sheet is dried and the coating fused at an elevated temperature. The coated sheet may be further processed by calendering, supercalendering, or embossing to effect certain changes desirable for a paritcular end use. For example, when used for motion picture projection screens, window shades, artificial leather, special wall coverings, and the like, the sheet is usually compacted and embossed to provide it with a pebble-grained leatherlike texture.

In addition to the elastomers mentioned as being present in the coating, other additives may be included to enhance certain specific properties. These may include fillers such as clay and heavy metal salts including barium, magnesium and calcium oxides or carbonates, pigments such as titanium dioxide, dyes for specific coloring effects, vinyl stabilizers, release agents such as curing silicones or high molecular weight waxes, etc.

The following are useful ranges for components utilized in typical coating formulations:

| Components: | Amount |
|---|---|
| Vinyl resin, parts by weight | 75–25 |
| Carboxylic acid-alkyl acrylate copolymer, parts by weight | 25–75 |
| Loading (clay, TiO$_2$, color, pigment, dye, etc.), parts by weight | 0–40 |
| Non-ionic surface active agent (nonyl phenoxy polyoxyethylene ethanol), parts by weight | 0–3 |
| Solids, percent | 10–60 |
| Viscosity at 52 percent total solids, centipoises | 20–4000 |
| Acetic acid for pH control 5.5–8.0 pH. | |

Particularly satisfactory results are obtained by using the vinyl resin in amounts from 40 to 70 parts by weight and the carboxylic acid-alkyl acrylate copolymer in amounts from 30 to 60 parts by weight in mixtures having a dry solids content of about 40 to 55 percent.

Specific coating formulations we have found especially useful include the following:

FORMULA I

| Components: | Amount |
|---|---|
| Polyvinyl chloride, parts by weight | 60 |
| Copolymer of 85 percent ethyl acrylate, 10 percent methyl methacrylate, 5 percent acrylic acid, parts by weight | 40 |
| Titanium dioxide, parts by weight | 20 |
| Total solids, percent | 52 |
| Viscosity, centipoises | 85 |
| Acetic acid to pH 6.7. | |

FORMULA II

| Components: | Amount |
|---|---|
| Copolymer of 80 percent vinyl chloride and 20 percent methyl acrylate, parts by weight | 60 |
| Copolymer of 85 percent ethyl acrylate, 10 percent methyl methacrylate and 5 percent acrylic acid, parts by weight | 40 |
| Titanium dioxide, parts by weight | 20 |
| Total solids, percent | 52 |
| Acetic acid to pH 6.7. | |

The following examples will more clearly illustrate specific embodiments of the invention. They are given by way of illustration only and are not intended as a limitation of the scope of the invention.

Example I

A fibrous web composed of 100 percent bleached kraft spruce fibers and having a basis weight of 13.0 pounds per 17 x 22—500 sheet ream, was saturated in the manner previously described with a synthetic elastomer consisting essentially of a copolymer of 68.5 percent butadiene and 31.5 percent acrylonitrile. The dried saturated fibrous web was passed over a coating roll running in a supply trough containing an aqueous dispersion of a coating composition consisting of 48 percent water and 52 percent by weight of a blend of 60 parts polyvinyl chloride; 40 parts of a copolymer consisting of 85 percent ethyl acrylate, 10 percent methyl methacrylate, and 5 percent acrylic acid; and 20 parts titanium dioxide as a pigment. The coating composition was maintained at a pH of 6.7 in the supply trough through the use of acetic acid. The latter also served to maintain the viscosity of the coating mixture at approximately 85 centipoises. The excess coating was doctored off with an equalizing rod of the Mayer rod type. This left a coating on the sheet of approximately 5½ pounds on a dry solids basis per 17 x 22—500 sheet ream. The sheet was then reversed in its direction of travel, bringing the wet coated side to the top, and passed through a tunnel oven consisting of four different temperature air zones. The temperature of the air in these zones ranged from about 225° F., to about 300° F. in increments of 25° F. The dried sheet was then passed under a bank of infrared radiant heaters which brought the dry coating up to a minimum temperature of 325° F., and fused the coating into a homogeneous mass. Then the coated sheet was cooled by passing it over chilled rolls, and wound up on a reel ready for shipment to the customer, or for additional processing.

Example II

The conditions of Example I were repeated except that for the 60 parts of polyvinyl chloride there was substituted 60 parts of a copolymer consisting of 80 parts by weight of vinyl chloride and 20 parts by weight of methyl acrylate.

Example III

The conditions of Example I were repeated except that for the 60 parts of polyvinyl chloride there was substituted 60 parts of a modified vinyl chloride copolymer known commercially as Geon 352 and produced by the B. F. Goodrich Chemical Company. This resin is a slightly modified copolymer in which the vinyl chloride predominates and has been copolymerized with lesser, but modifying, ratios of one or more than one of a variety of monomers copolymerizable therewith including vinyl and vinylidene esters of organic and inorganic acids, olefinic hydrocarbons such as styrene and isobutylene, and esters of olefinic acids such as acrylic and methacrylic.

When the coating compositions listed above were used in commercial production it was found that in addition to the improvement they gave to the characteristics of the finished tape, the coating compositions themselves had a further advantage in that they displayed much better mechanical stability in the coating apparatus than materials used previously. They did not break down as easily under the extensive mechanical working received during the coating operation. This permitted longer runs, better control, and less operation down time than was possible hitherto. A further advantage of the higher mechanical stability of the coating compositions is the fact that it permitted use with a greater variety of coating equipment.

It will be understood that other methods and means of applying the principle of the invention herein described may be used without departing from the spirit and scope of the invention as specifically pointed out and described in the above specification and the appended claims.

We claim:

1. A coated web product comprising an elastomer saturated non-woven fibrous web having a coating on at least one side thereof, said coating comprising from 25 to 75 parts by weight of a polymeric vinyl resin having physically blended therewith from 25 to 75 parts by weight of an external plasticizer, said polymeric vinyl resin being selected from the group consisting of polyvinyl chloride, polyvinyl acetate, copolymers of vinyl chloride and vinyl acetate, copolymers of vinyl chloride and vinylidene chloride, and copolymers of vinyl chloride and an alkyl acrylate, said external plasticizer comprising a copolymer of from about 0.5 to 7 percent by weight of at least one polymerizable mono-unsaturated alpha-beta ethylenic carboxylic acid, at least 80% by weight of one alkyl acrylate in which the alkyl group has from 1 to 4 carbon atoms, and from 0 to 19.5 percent of an alkyl methacrylate in which the alkyl group has from 1 to 4 carbon atoms.

2. A base stock for pressure sensitive tape comprising an elastomer saturated non-woven web of cellulosic fibers coated on at least one side with a composition comprising from 25 to 75 parts by weight of a polymeric vinyl resin in physical admixture with from 75 to 25 parts by weight of an external plasticizer, said polymeric vinyl resin being selected from the group consisting of polyvinyl chloride, polyvinyl acetate, copolymers of vinyl chloride and vinyl acetate, copolymers of vinyl chloride and vinylidene chloride, copolymers of vinyl chloride and an alkyl acrylate, said external plasticizer comprising a copolymer of from about 0.5 to 7 percent by weight of at least one polymerizable mono-unsaturated alpha-beta ethylenic carboxylic acid, at least 80% by weight of one alkyl acrylate in which the alkyl group has from 1 to 4 carbon atoms, and from 0 to 19.5 percent of an alkyl methacrylate in which the alkyl group has from 1 to 4 carbon atoms.

3. A base stock for pressure sensitive tape comprising an elastomer saturated non-woven web of cellulosic fibers coated on at least one side with a composition comprising from 40 to 70 parts by weight of a polymeric vinyl resin in physical admixture with from 30 to 60 parts by weight of an external plasticizer, said polymeric vinyl resin being selected from the group consisting of vinyl chloride and vinyl acetate, copolymers of vinyl chloride and an alkyl acrylate, said external plasticizer comprising a copolymer of from about 0.5 to 7 percent by weight of at least one polymerizable mono-unsaturated alpha-beta ethylenic carboxylic acid, at least 80% of an alkyl acrylate in which the alkyl group has from 1 to 4 carbon atoms, and from 0 to 19.5 percent of an alkyl methacrylate in which the alkyl group has from 1 to 4 carbon atoms.

4. A pressure sensitive adhesive tape in roll form comprising a non-woven fibrous web saturated with an elastomeric binder, a pressure sensitive adhesive coating on one side of said web, and a release coating on the opposite side of said web, said release coating comprising from 25 to 75 parts by weight of a polymeric vinyl resin having physically blended therewith from 75 to 25 parts by weight of an external plasticizer, said polymeric vinyl resin being selected from the group consisting of polyvinyl chloride, polyvinyl acetate, copolymers of vinyl chloride and vinyl acetate, copolymers of vinyl chloride and vinylidene chloride, and copolymers of vinyl chloride and an alkyl acrylate, said external plasticizer comprising a copolymer of from 0.5 to 7 percent by weight of at least one polymerizable mono-unsaturated alpha-beta ethylenic carboxylic acid, at least 80% of an alkyl acrylate in which the alkyl group has from 1 to 4 carbon atoms, and from 0 to 19.5 percent of an alkyl methacrylate in which the alkyl group has from 1 to 4 carbon atoms.

5. A pressure sensitive adhesive tape in roll form comprising a non-woven cellulosic fiber web saturated with an elastomeric binder, a pressure sensitive adhesive coating on one side of said web, and a release coating on the opposite side of said web, said release coating comprising from 40 to 70 parts by weight of a polymeric vinyl resin having physically blended therewith from 30 to 60 parts by weight of an external plasticizer, said polymeric vinyl resin being selected from the group consisting of polyvinyl chloride, polyvinyl acetate, copolymers of vinyl chloride and an alkyl acrylate, said external plasticizer comprising a copolymer of from 0.5 to 7 percent by weight of at least one polymerizable mono-unsaturated alpha-beta ethylenic carboxylic acid, at least 80% of an alkyl acrylate in which the alkyl group has from 1 to 4 carbon atoms, and from 0 to 19.5 percent of an alkyl methacrylate in which the alkyl group has from 1 to 4 carbon atoms.

6. A base web for pressure sensitive tape comprising a non-woven cellulosic fiber web saturated with an elastomeric binder and having a release coating on at least one side thereof, said release coating comprising a physical mixture of about 60 parts by weight of a copolymerized vinyl resin and about 40 parts by weight of an external plasticizer therefor, said copolymerized vinyl resin consisting essentially of a major portion of vinyl chloride and a minor portion of an alkyl acrylate, said external plasticizer comprising a copolymer of about 5% of a polymerizable unsaturated carboxylic acid, about 85% of an alkyl acrylate in which the alkyl group has from 1 to 4 carbon atoms, and about 10% of an alkyl methacrylate in which the alkyl group has from 1 to 4 carbon atoms.

7. A base web for pressure sensitive tape comprising a non-woven cellulosic fiber web saturated with an elastomeric binder and having a release coating on at least one side thereof, said release coating comprising a physical mixture of about 60 parts by weight of polyvinyl chloride and about 40 parts by weight of an external plasticizer therefor, said external plasticizer comprising a copolymer of about 5% of a polymerizable unsaturated carboxylic acid, and about 85% of an alkyl acrylate in which the alkyl group has from 1 to 4 carbon atoms, and about 10% of an alkyl methacrylate in which the alkyl group has from 1 to 4 carbon atoms.

References Cited in the file of this patent

UNITED STATES PATENTS

| | | |
|---|---|---|
| 2,125,527 | Tyce et al. | Aug. 2, 1938 |
| 2,201,877 | Anderson | May 21, 1940 |
| 2,311,249 | Powell | Feb. 16, 1943 |
| 2,330,353 | Henderson | Sept. 28, 1943 |
| 2,366,414 | Lindh | Jan. 2, 1945 |
| 2,438,195 | Tierney | Mar. 23, 1948 |
| 2,631,947 | Kline | Mar. 17, 1953 |
| 2,636,870 | Connors | Apr. 28, 1953 |
| 2,676,942 | Gloss | Apr. 27, 1954 |
| 2,682,484 | Thomas | June 29, 1954 |
| 2,748,027 | Meier | May 29, 1956 |
| 2,763,578 | Simmons | Sept. 18, 1956 |
| 2,790,735 | McLaughlin et al. | Apr. 30, 1957 |
| 2,829,073 | Williams | Apr. 1, 1958 |
| 2,868,763 | Montgomery | Jan. 13, 1959 |
| 2,887,403 | Wolff | May 19, 1959 |
| 2,910,385 | Berry et al. | Oct. 27, 1959 |
| 2,944,037 | Clark | July 5, 1960 |
| 2,989,423 | Malmquist et al. | June 20, 1961 |